United States Patent
Rink et al.

(10) Patent No.: US 11,711,732 B2
(45) Date of Patent: Jul. 25, 2023

(54) MINIMIZING DISRUPTION TO A VOICE CALL IN A MOBILE NETWORK THAT INCLUDES DIFFERENT NETWORK SEGMENTS HAVING DIFFERENT CAPABILITIES FOR SUPPORTING VOICE CALLS

(71) Applicant: Microsoft Technology Licensing, LLC, Redmond, WA (US)

(72) Inventors: Fred Walter Rink, Fairview, TX (US); Haibo Qian, Frisco, TX (US); Michael Anthony Brown, McKinney, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/324,832

(22) Filed: May 19, 2021

(65) Prior Publication Data
US 2022/0377623 A1 Nov. 24, 2022

(51) Int. Cl.
*H04W 36/00* (2009.01)
(52) U.S. Cl.
CPC ... *H04W 36/0022* (2013.01); *H04W 36/0083* (2013.01)
(58) Field of Classification Search
CPC .......... H04L 67/1021; H04W 28/0226; H04W 36/14; H04W 36/0022; H04W 36/0033; H04W 36/0011; H04W 36/0083
See application file for complete search history.

(56) References Cited

U.S. PATENT DOCUMENTS 10,064,118 B2  8/2018 Yeoum et al.
2015/0188882 A1*  7/2015 Wang .................. H04L 65/1046
                                                    370/352
(Continued)

FOREIGN PATENT DOCUMENTS

CN    110708728 A  *  1/2020
CN    110856229 A     2/2020
(Continued)

OTHER PUBLICATIONS

Elnashar, et al., "Practical Performance Analyses of Circuit-Switched Fallback and Voice Over LTE", in Journal of IEEE Transactions on Vehicular Technology, vol. 66, Issue 2, Feb. 2017, pp. 1748-1759.

(Continued)

*Primary Examiner* — Allahyar Kasraian
(74) *Attorney, Agent, or Firm* — Ray Quinney & Nebeker P.C; James Bullough

(57) ABSTRACT

A transition region can be defined for a first network segment that can provide wireless communication services using a first radio access technology (RAT) and a second RAT and that supports Internet protocol (IP) packet-based voice calls. The transition region can be defined based at least in part on a first coverage area of the first network segment and a second coverage area of a second network segment that does not support IP packet-based voice calls and does not support a first handoff mechanism based on the first RAT. A network node can be notified about an IP packet-based voice call involving a user equipment (UE) that is receiving service from the first network segment using a first RAT. Upon determining that the UE is located within the transition region, the network node can cause the UE to be switched to a second RAT for the IP packet-based voice call.

20 Claims, 7 Drawing Sheets

(56) References Cited

U.S. PATENT DOCUMENTS

| | | | |
|---|---|---|---|
| 2019/0313229 A1* | 10/2019 | Chiang | H04W 4/90 |
| 2020/0112892 A1 | 4/2020 | Shi et al. | |
| 2020/0252849 A1 | 8/2020 | Tang | |
| 2020/0329404 A1* | 10/2020 | Vikberg | H04L 65/1016 |
| 2020/0351726 A1* | 11/2020 | Chauhan | H04W 36/0069 |
| 2021/0045018 A1* | 2/2021 | Xu | H04W 36/0022 |
| 2021/0051530 A1 | 2/2021 | Venkataraman et al. | |
| 2021/0127314 A1 | 4/2021 | Mukherjee et al. | |
| 2021/0136634 A1 | 5/2021 | Bakker et al. | |

FOREIGN PATENT DOCUMENTS

| | | |
|---|---|---|
| CN | 112333762 A | 2/2021 |
| WO | 2020248752 A1 | 12/2020 |

OTHER PUBLICATIONS

Kreher, Ralf, "The 3G4G Blog: EPS Fallback in 5G Standalone Deployments", Retrieved from: https://blog.3g4g.co.uk/2020/02/eps-fallback-expected-in-5g-standalone.html, Feb. 21, 2020, 15 Pages.

"International Search Report and Written Opinion Issued in PCT Application No. PCT/US22/026421", dated Aug. 4, 2022, 14 Pages.

\* cited by examiner

MINIMIZING DISRUPTION TO A VOICE CALL IN A MOBILE NETWORK THAT INCLUDES DIFFERENT NETWORK SEGMENTS HAVING DIFFERENT CAPABILITIES FOR SUPPORTING VOICE CALLS

CROSS-REFERENCE TO RELATED APPLICATIONS

The Third Generation Partnership Project (3GPP) is a consortium of a number of standards organizations that develop protocols for mobile telecommunications. 3GPP is responsible for the development of Long-Term Evolution (LTE) and related fourth generation (4G) standards, including LTE Advanced and LTE Advanced Pro. 3GPP is also responsible for the development of fifth generation (5G) standards. 5G systems are already being deployed and are expected to become widespread in the near future.

Voice over LTE (VoLTE) is a 3GPP standard that provides for voice services in an LTE network. VoLTE is based on the IP Multimedia Subsystem (IMS) framework, which means that voice services in an LTE network are IP packet-based. This is different from how voice services are provided in older, legacy networks, such as second generation (2G) and third generation (3G) networks. In these legacy networks, voice services are provided as circuit-switched calls.

In a 5G network, voice services are provided by Voice over New Radio (VoNR) technology. Like VoLTE, VoNR is also a type of voice-over-IP (VoIP) technology that is based on the IMS framework. VoNR and VoLTE can be thought of as different access modes for IMS communication services.

Mobile network operators typically build and expand their networks gradually over time based on a number of factors, including subscriber demand. As a result, many mobile networks include some network segments that have been upgraded to support the latest technology (e.g., 4G and 5G technology) and some network segments that are still using legacy technology (e.g., 2G and 3G technology). Therefore, there can be situations when a user equipment (UE) moves from a geographical region where service is provided by a 4G or 5G network segment to another geographical region where LTE coverage is unavailable and service is provided by a legacy network.

The 3GPP TS 23.216 standard defines a mechanism known as Single Radio Voice Call Continuity (SRVCC). SRVCC enables a VoLTE call to be transferred from an LTE packet-switched network segment to a legacy circuit-switched voice network segment while the call is in progress, while satisfying existing user experience expectations for minimal call interruption and low call drop rates. This mechanism may be referred to herein as a "VoLTE SRVCC mechanism." The VoLTE SRVCC mechanism is network controlled, and calls remain under the control of the IMS core network. The network controls and guides the user device from an LTE network segment to a 2G/3G network segment as the user moves out of LTE coverage.

In addition to defining an LTE SRVCC mechanism, the 3GPP TS 23.216 standard also defines an SRVCC mechanism that enables a VoNR call to be transferred from a 5G packet-switched network to a legacy circuit-switched network. This mechanism may be referred to herein as a "VoNR SRVCC mechanism."

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

One aspect of the present disclosure is directed to a method for minimizing disruption to a voice call in a mobile telecommunications network comprising a plurality of different network segments having different capabilities for supporting voice calls. The method is implemented by a network node in the mobile telecommunications network. The method includes defining a transition region of a first network segment that can provide wireless communication services using a first radio access technology and a second radio access technology and that supports Internet protocol (IP) packet-based voice calls. The transition region is defined based at least in part on a first coverage area of the first network segment and a second coverage area of a second network segment that does not support IP packet-based voice calls and does not support a first handoff mechanism based on the first radio access technology. The method also includes receiving an indication that a user equipment (UE) that is receiving wireless communication services from the first network segment using a first radio access technology is going to participate in an IP packet-based voice call, determining that the UE is located within the transition region of the first network segment, and causing the UE to be switched to a second radio access technology for the IP packet-based voice call. The second network segment supports a second handoff mechanism based on the second radio access technology.

In some embodiments, the first radio access technology can comprise a fifth generation (5G) New Radio (NR) radio access technology, and the second radio access technology can comprise a fourth generation (4G) Long Term Evolution (LTE) radio access technology.

In some embodiments, the first handoff mechanism can comprise a Voice over New Radio (VoNR) Single Radio Voice Call Continuity (SRVCC) mechanism, and the second handoff mechanism can comprise a Voice over LTE (VoLTE) SRVCC mechanism.

In some embodiments, determining that the UE is located within the transition region of the first network segment can comprise identifying a tracking area where the UE is located, and determining that the tracking area has been assigned to the transition region.

In some embodiments, determining that the UE is located within the transition region of the first network segment can comprise identifying a cell identifier corresponding to a base station that is providing service to the UE, and determining that the cell identifier has been assigned to the transition region.

In some embodiments, the method can additionally include detecting that the UE is moving from the first network segment to the second network segment, and causing a handoff of the IP packet-based voice call from the first network segment to the second network segment. The handoff can occur in accordance with the second handoff mechanism that is based on the second radio access technology.

In some embodiments, receiving the indication that the UE is going to participate in the IP packet-based voice call can comprise detecting that the UE has initiated the IP packet-based voice call.

In some embodiments, receiving the indication that the UE is going to participate in the IP packet-based voice call can comprise detecting that the UE has received the IP packet-based voice call.

Another aspect of the present disclosure is directed to a method for minimizing disruption to a voice call in a mobile telecommunications network comprising a plurality of different network segments having different capabilities for supporting voice calls. The method is implemented by a user equipment (UE) that is receiving wireless communication services from a first network segment of the mobile telecommunications network using a first radio access technology. The first network segment is also configured to provide the wireless communication services using a second radio access technology. The method includes receiving a command from a network node to switch from the first radio access technology to the second radio access technology for an Internet protocol (IP) packet-based voice call. The command is received while the UE is located within a transition region of the first network segment. The transition region is defined based at least in part on a first coverage area of the first network segment and a second coverage area of a second network segment that does not support IP packet-based voice calls and does not support a first handoff mechanism based on the first radio access technology. The method includes switching to the second radio access technology for the IP packet-based voice call in response to the command, moving from the first coverage area of the first network segment into the second coverage area of the second network segment during the IP packet-based voice call, and participating in a handoff of the IP packet-based voice call from the first network segment to the second network segment. The handoff occurs in accordance with a second handoff mechanism that is based on the second radio access technology.

In some embodiments, the first radio access technology can comprise a fifth generation (5G) New Radio (NR) radio access technology, and the second radio access technology can comprise a fourth generation (4G) Long Term Evolution (LTE) radio access technology.

In some embodiments, the first handoff mechanism can comprise a Voice over New Radio (VoNR) Single Radio Voice Call Continuity (SRVCC) mechanism, and the second handoff mechanism can comprise a Voice over LTE (VoLTE) SRVCC mechanism.

In some embodiments, the method can additionally comprise initiating the IP packet-based voice call. The command can be received in response to initiating the IP packet-based voice call.

In some embodiments, the method can additionally comprise receiving the IP packet-based voice call. The command can be received in response to receiving the IP packet-based voice call.

Another aspect of the present disclosure is directed to a system for minimizing disruption to a voice call in a mobile telecommunications network comprising a plurality of different network segments having different capabilities for supporting voice calls. The system comprises one or more processors, memory in electronic communication with the one or more processors, and instructions stored in the memory. The instructions are executable by the one or more processors to define a transition region of a first network segment that can provide wireless communication services using a first radio access technology and a second radio access technology and that supports Internet protocol (IP) packet-based voice calls. The transition region is defined based at least in part on a first coverage area of the first network segment and a second coverage area of a second network segment that does not support IP packet-based voice calls and does not support a first handoff mechanism based on the first radio access technology. The instructions are also executable by the one or more processors to receive an indication that a user equipment (UE) that is receiving wireless communication services from the first network segment using a first radio access technology is going to participate in an IP packet-based voice call, determine that the UE is located within the transition region of the first network segment, and cause the UE to be switched to a second radio access technology for the IP packet-based voice call. The second network segment supports a second handoff mechanism based on the second radio access technology.

In some embodiments, the first radio access technology can comprise a fifth generation (5G) New Radio (NR) radio access technology, and the second radio access technology can comprise a fourth generation (4G) Long Term Evolution (LTE) radio access technology.

In some embodiments, the first handoff mechanism can comprise a Voice over New Radio (VoNR) Single Radio Voice Call Continuity (SRVCC) mechanism, and the second handoff mechanism can comprise a Voice over LTE (VoLTE) SRVCC mechanism.

In some embodiments, determining that the UE is located within the transition region of the first network segment can comprise identifying at least one of a tracking area where the UE is located or a cell identifier corresponding to a base station that is providing service to the UE, and determining that the tracking area or the cell identifier has been assigned to the transition region.

In some embodiments, the instructions are additionally executable by the one or more processors to detect that the UE is moving from the first network segment to the second network segment, and cause a handoff of the IP packet-based voice call from the first network segment to the second network segment. The handoff can occur in accordance with the second handoff mechanism that is based on the second radio access technology.

In some embodiments, receiving the indication that the UE is going to participate in the IP packet-based voice call can comprise detecting that the UE has initiated the IP packet-based voice call.

In some embodiments, receiving the indication that the UE is going to participate in the IP packet-based voice call can comprise detecting that the UE has received the IP packet-based voice call.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
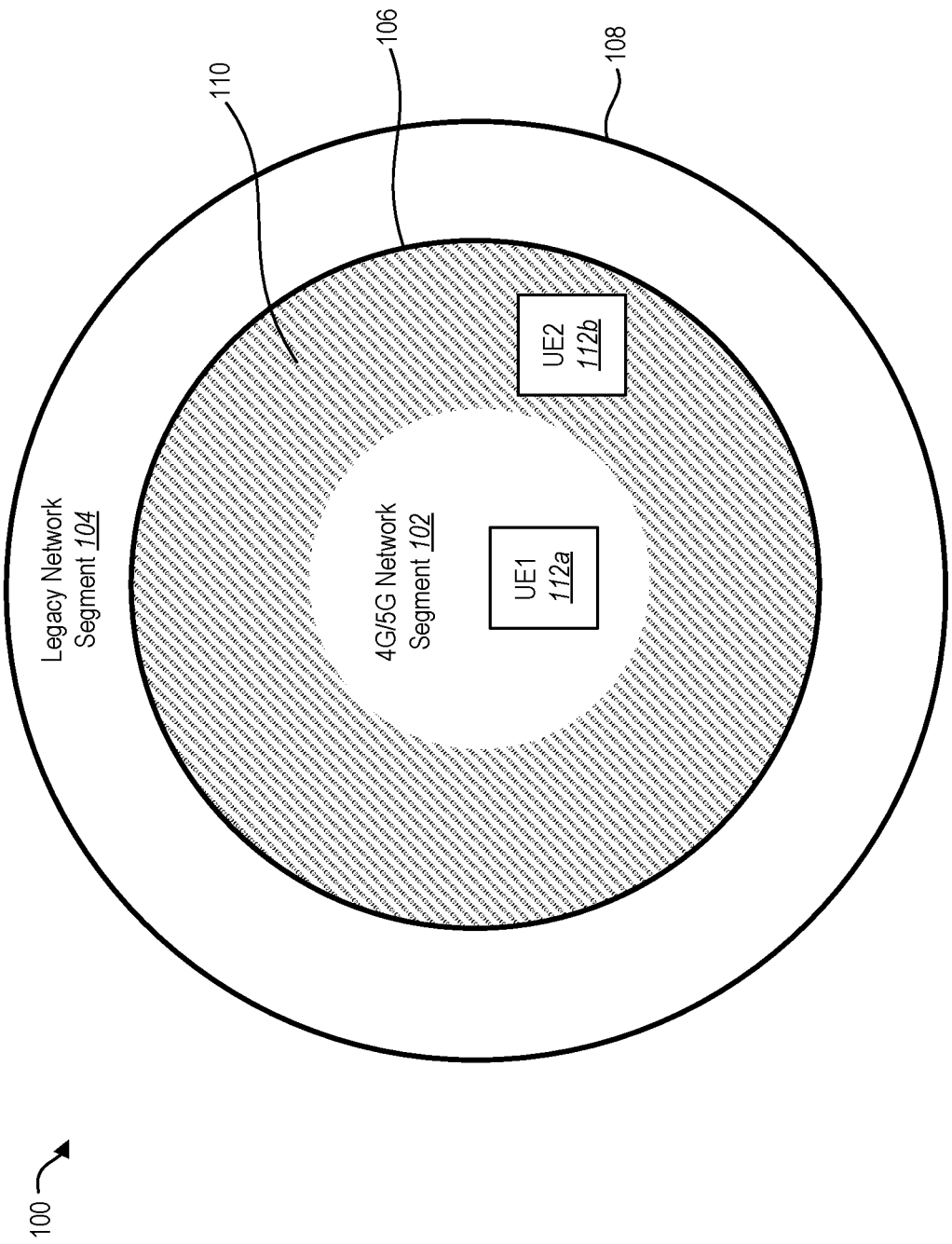
FIG. 1 illustrates aspects of a mobile telecommunications network in which the techniques disclosed herein can be utilized.

The present disclosure is generally related to a mobile telecommunications network that includes some network segments that support current technology (e.g., 4G and 5G technology), and other network segments that are still using legacy technology (e.g., 2G and 3G technology).

In the discussion that follows, a mobile telecommunications network may be referred to as a mobile network or simply as a network.

The term "network segment" can refer to a section or portion of a mobile telecommunications network. A mobile telecommunications network can include a plurality of different network segments that have different capabilities.

A network segment that supports 5G technology may be referred to herein as a "5G network segment." A network segment that supports 4G technology may be referred to herein as a "4G network segment." A network segment that supports LTE technology (which is an example of 4G technology) may be referred to herein as an "LTE network segment."

Most 5G network segments also support 4G technology. A network segment that supports both 4G and 5G technology may be referred to herein as a "4G/5G network segment." A UE that is located in a 4G/5G network segment can receive 5G service, or it can receive 4G service. In other words, wireless communications involving the UE can occur in accordance with 5G technology using network components that support 5G technology, or wireless communications involving the UE can occur in accordance with 4G technology using network components that support 4G technology.

A network segment that does not support either 4G or 5G technology but that instead supports older technology (e.g., 2G and/or 3G technology) may be referred to herein as a "legacy network segment." A mobile network that includes one or more 4G/5G network segments and one or more legacy network segments may be referred to herein as a "hybrid mobile network" (or simply as a "hybrid network").

The present disclosure is related to a mobile telecommunications network that has a plurality of different network segments having different capabilities for supporting voice calls. For example, a mobile telecommunications network can include one or more 4G/5G network segments and one or more legacy network segments. As discussed above, the 4G/5G network segments support IP packet-based voice calls, but the legacy network segments do not support IP packet-based voice calls. In the legacy network segments, voice services are provided as circuit-switched calls.

As noted above, a Single Radio Voice Call Continuity (SRVCC) mechanism has been defined that enables a voice call to be transferred from a packet-switched network segment to a circuit-switched network segment while the call is in progress. As also noted above, the 3GPP TS 23.216 standard defines both a VoLTE SRVCC mechanism (for transferring a voice call from a 4G network segment to a legacy network segment) and a VoNR SRVCC mechanism (for transferring a voice call from a 5G network segment to a legacy network segment). Most mobile networks have been upgraded so that legacy network segments support the VoLTE SRVCC mechanism. However, there are many mobile networks that have legacy network segments that would need to be upgraded in order to support the VoNR SRVCC mechanism.

Upgrading legacy network segments to support the VoNR SRVCC mechanism can be quite costly, and doing so might not make sense from a cost-benefit standpoint. It is likely that at least some (and possibly many) mobile network operators will choose to not upgrade their legacy network segments to support the VoNR SRVCC mechanism.

However, this creates a potential problem in a hybrid mobile network. Consider a scenario where a UE is located in a 4G/5G network segment and is receiving 5G service. Suppose that the UE initiates or receives a VoNR voice call (i.e., a voice call using 5G VoNR technology) and then moves, during the duration of the call, outside of the coverage area of the 4G/5G network segment and into a geographical region where the only available coverage is provided by a legacy network segment. If the legacy network segment has not been upgraded to support the VoNR SRVCC mechanism, then it would not be possible to use the SRVCC mechanism to handoff the VoNR voice call from the 4G/5G network segment to the legacy network segment. The VoNR voice call would then be dropped. This is, of course, undesirable and would negatively affect the user's experience.

One aspect of the present disclosure is related to addressing this problem. In particular, the present disclosure describes techniques for enabling an operator of a hybrid mobile network to utilize an SRVCC mechanism to minimize disruption to voice calls in the scenario described above without having to upgrade their legacy network segments to support the VoNR SRVCC mechanism.

The techniques disclosed herein can be applicable to a UE that is located in a 4G/5G segment and that is receiving 5G service. When such a UE initiates or receives a voice call, the UE may under some circumstances be downgraded to 4G service for the voice call. In other words, if the UE initiates or receives a VoNR voice call (i.e., a voice call in accordance with 5G technology), the UE can in some situations be downgraded so that the voice call is a VoLTE voice call (i.e., a voice call in accordance with 4G technology). Downgrading the UE from 5G service to 4G service makes it possible for a handoff to occur if the UE moves outside of the coverage area of the 4G/5G network segment and into the coverage area of a legacy network segment that has not yet been upgraded to support the VoNR SRVCC mechanism. In particular, downgrading the UE from a 5G VoNR voice call to a 4G VoLTE voice call makes it possible for the VoLTE SRVCC mechanism to be used for a handoff from the 4G/5G network segment to the legacy network segment. This is because most legacy network segments have been upgraded to support the VoLTE SRVCC mechanism, even if they have not been upgraded to support the VoNR SRVCC mechanism.

In determining whether a UE should be downgraded from 5G service to 4G service, the proximity of the UE to the boundary between the coverage area of the 4G/5G network segment and the coverage area of the legacy network segment can be taken into consideration. For example, if the UE is located close to the outer limits of the coverage area of the 4G/5G network segment when a voice call is initiated or received, an inference can be drawn that it is reasonably likely that the UE will move outside of the coverage area of the 4G/5G network segment and into the coverage area of a legacy network segment during the duration of the voice call. In preparation for this to occur, the UE can be downgraded from 5G service to 4G service in order to facilitate handoff of the voice call in the event that the UE actually does move outside of the coverage area of the 4G/5G network segment during the duration of the voice call.

In some embodiments, one or more transition regions can be defined within a 4G/5G network segment. A transition region can be defined in relation to a boundary between the 4G/5G network segment and a legacy network segment. For example, a transition region can be defined as a region of the 4G/5G network segment that is within a certain pre-defined distance of a boundary between the 4G/5G network segment and a legacy network segment. The boundary can be identified as a specific list of tracking areas or a list of 5G cell identifiers for the 5G network segment. In some embodiments, if a UE initiates or receives a 5G VoNR voice call while the UE is located within a transition region of a 4G/5G network segment, the UE can be downgraded from 5G service to 4G service so that the voice call is a 4G VoLTE voice call.

FIG. 1 illustrates aspects of a mobile telecommunications network 100 in which the techniques disclosed herein can be utilized. The mobile network 100 includes a plurality of different network segments having different capabilities for supporting voice calls. In particular, the mobile network 100 includes a 4G/5G network segment 102 and a legacy network segment 104. As discussed above, the 4G/5G network segment 102 supports IP packet-based voice calls, but the legacy network segment 104 does not support IP packet-based voice calls. In the legacy network segment 104, voice services are provided as circuit-switched calls.

Two concentric circles are shown in FIG. 1: a first circle 106 and a second circle 108. The region inside the first circle 106 represents a geographical area for which the 4G/5G network segment 102 can provide coverage. The region outside the first circle 106 and inside the second circle 108 represents a geographical area for which the 4G/5G network segment 102 cannot provide coverage but the legacy network segment 104 can provide coverage.

For purposes of the present example, it will be assumed that the legacy network segment 104 supports the VoLTE SRVCC mechanism. As discussed above, the VoLTE SRVCC mechanism facilitates handoff of a VoLTE voice call from the 4G/5G network segment 102 to the legacy network segment 104. However, it will also be assumed that the legacy network segment 104 does not support the VoNR SRVCC mechanism. Because the legacy network segment 104 does not support the VoNR SRVCC mechanism, it will be assumed that it is not possible to handoff VoNR voice calls from the 4G/5G network segment 102 to the legacy network segment 104 in the present example.

As noted above, the techniques disclosed herein can be applicable to a UE that is located in a 4G/5G network segment 102 and that is receiving 5G service. When such a UE initiates or receives a 5G VoNR voice call, the UE may under some circumstances be downgraded to 4G service for the voice call. Downgrading the UE from a 5G VoNR voice call to a 4G VoLTE voice call makes it possible for the VoLTE SRVCC mechanism to be used for a handoff from the 4G/5G network segment 102 to the legacy network segment 104.

In the depicted example, the decision about whether to downgrade a UE for a voice call depends at least in part on whether the UE is located within a transition region 110 of the 4G/5G network segment 102. In FIG. 1, the shaded region of the 4G/5G network segment 102 represents the transition region 110. When a UE initiates or receives a 5G VoNR voice call, a determination can be made about whether the UE is located within the transition region 110 of the 4G/5G network segment 102. If the UE is located within the transition region 110 of the 4G/5G network segment 102, the UE can be downgraded from 5G service to 4G service so that the voice call is a 4G VoLTE voice call. On the other hand, if the UE is not located within the transition region 110 of the 4G/5G network segment 102, the UE can be permitted to proceed with the 5G VoNR voice call.

Two UEs are shown in FIG. 1: UE1 112A and UE2 112B. Both UE1 112A and UE2 112B are located in the coverage area of the 4G/5G network segment 102. UE1 112A is not located in the transition region 110 of the coverage area of the 4G/5G network segment 102. Therefore, if UE1 112A initiates or receives a 5G VoNR voice call, UE1 112A can be permitted to proceed with the 5G VoNR voice call. However, UE2 112B is located in the transition region 110 of the coverage area of the 4G/5G network segment 102. Therefore, if UE2 112B initiates or receives a 5G VoNR voice call, UE2 112B can be downgraded from 5G service to 4G service so that the voice call is a 4G VoLTE voice call. Therefore, if UE2 112B moves from the 4G/5G network segment 102 to the legacy network segment 104 during the duration of the VoLTE voice call, a handoff of the VoLTE voice call can be performed using the VoLTE SRVCC mechanism. Similarly, should UE1 112A move into the transition region 110 while in a voice call, a 5G-to-4G handover can be triggered to move from VoNR to VoLTE.

For the sake of clarity in illustrating the depicted example, the size of the transition region 110 in FIG. 1 appears relatively large compared to the total coverage area of the 4G/5G network segment 102. However, this should not be interpreted as limiting the scope of the present disclosure. The size of a transition region 110 within a 4G/5G network segment 102 relative to the total coverage area of the 4G/5G network segment 102 can be less than, equal to, or greater than what is depicted in the example shown in FIG. 1.

For the sake of clarity, the techniques disclosed herein have thus far been described in relation to a 4G/5G network segment and a legacy network segment (such as the 4G/5G network segment 102 and the legacy network segment 104 shown in FIG. 1). However, this should not be interpreted as limiting the scope of the present disclosure. The techniques disclosed herein can be used in connection with any mobile telecommunications network having a plurality of different network segments having different capabilities for supporting voice calls.

More specifically, the techniques disclosed herein can be used in connection with any mobile telecommunications network that includes a first network segment that supports IP packet-based voice calls (e.g., the 4G/5G network segment 102) and a second network segment that does not support IP packet-based voice calls (e.g., the legacy network segment 104), where the first network segment is capable of providing wireless communication services using at least two different radio access technologies. For example, the first network segment can be capable of providing wireless communication services using a first radio access technology (e.g., the 5G NR radio access technology) and a second radio access technology (e.g., the 4G LTE radio access technology). If the second network segment does not support a handoff mechanism based on the first radio access technology (e.g., the VoNR SRVCC mechanism) but does support a handoff mechanism using the second radio access technology (e.g., the VoLTE SRVCC mechanism), then the techniques disclosed herein can be utilized to downgrade a voice call from the first radio access technology to the second radio access technology under some circumstances. For example, if a UE that is receiving wireless communication services using the first radio access technology initiates or receives a voice call when it is positioned relatively close to the boundary between the first network segment and the second network segment, the UE can be downgraded from the first radio access technology to the second radio access technology so that the voice call proceeds using the second radio access technology.

Figure 2:
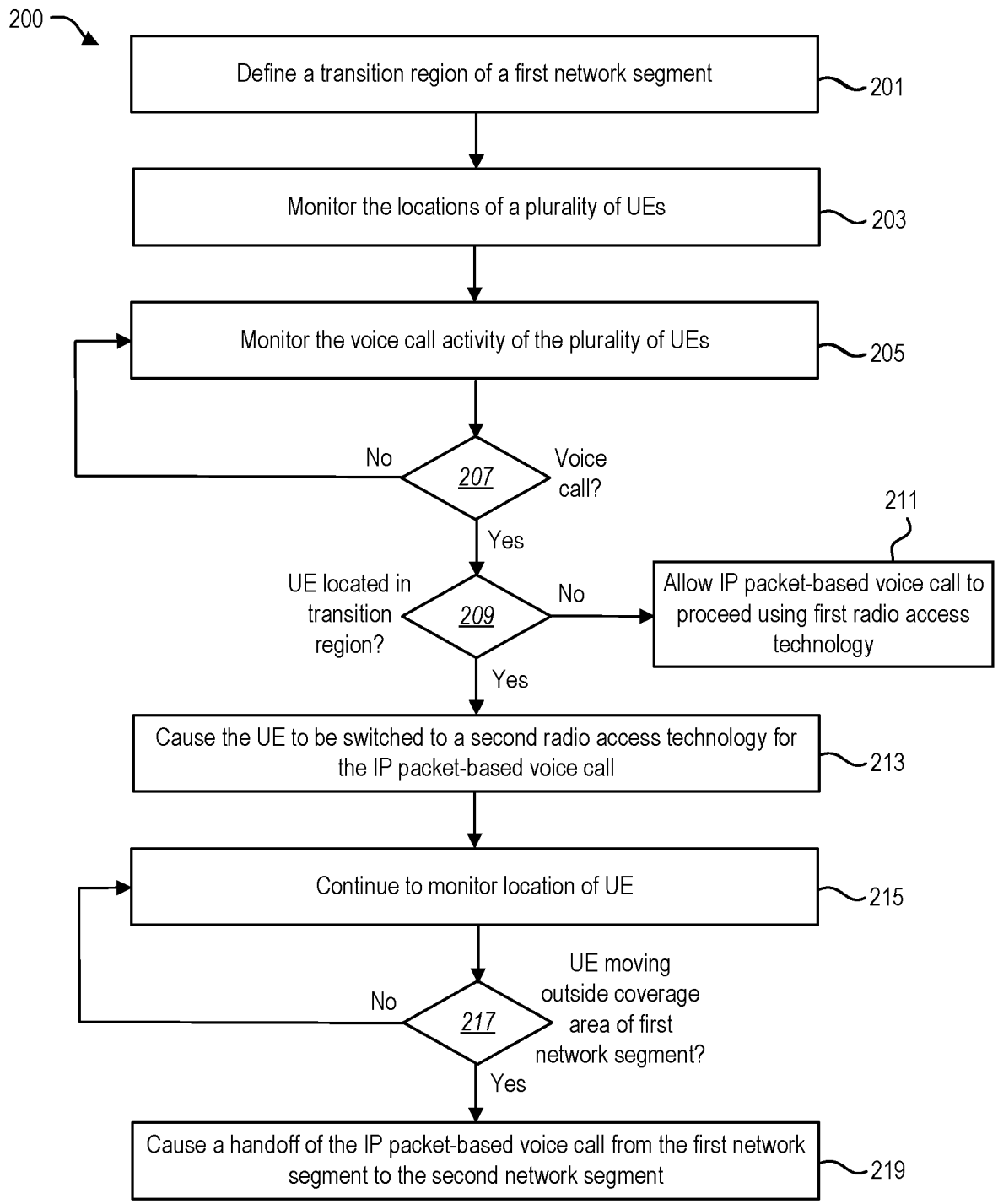
FIG. 2 illustrates an example of a method that can be implemented by one or more network nodes in accordance with the present disclosure.

FIG. 2 illustrates an example of a method 200 that can be implemented by one or more network nodes in accordance with the present disclosure. For the sake of clarity, the method 200 will be described in relation to the mobile telecommunications network 100 shown in FIG. 1. In some embodiments, the method 200 shown in FIG. 2 can be implemented by an Access and Mobility Management Function (AMF).

As discussed above, the mobile telecommunications network 100 includes a first network segment (e.g., a 4G/5G network segment 102) and a second network segment (e.g., a legacy network segment 104). The first network segment supports IP packet-based voice calls, but the second network segment does not. The first network segment is capable of providing wireless communication services using a first radio access technology (e.g., the 5G NR radio access technology) or a second radio access technology (e.g., the 4G LTE radio access technology). In contrast, the second network segment provides wireless communication services using an older technology (e.g., a 2G or 3G radio access technology) in which voice services are provided as circuit-switched calls. For purposes of the present example, it will be assumed that the second network segment does not support a handoff mechanism based on the first radio access technology (e.g., a VoNR SRVCC mechanism), but the second network segment does support a handoff mechanism based on the second radio access technology (e.g., a VoLTE SRVCC mechanism).

The method 200 includes defining 201 a transition region 110 of the first network segment. As discussed above, the transition region 110 can be a part of the first network segment in which it is reasonably likely that a UE will move outside of the coverage area of the first network segment and into the coverage area of a second network segment. The transition region 110 can be defined based at least in part on the coverage area of the first network segment and the coverage area of the second network segment. For example, the transition region 110 can be defined to include an outer region of the first network segment, i.e., a part of the first network segment that is relatively close to the end of the coverage area of the first network segment and that is also close to the coverage area of the second network segment.

In some embodiments, the transition region 110 can be defined in relation to tracking areas of the mobile telecommunications network 100 or a list of cell identifiers. For example, the transition region 110 can be defined as a set of 5G tracking areas and/or a set of 5G cell identifiers.

In embodiments where tracking areas are used, the network operator can configure a network node (e.g., the AMF) with tracking areas where UEs should be switched from the first radio access technology to the second radio access technology. These tracking areas form the transition region 110. This will be discussed in greater detail below.

Alternatively, the transition region 110 can be defined in terms of cell identifiers. In a 5G network segment, a 5G cell identifier can refer to a specific NR radio (gNodeB). This approach allows more refined definition of the transition region as one tracking area typically includes many NR radios.

The method 200 can also include monitoring 203 the locations of a plurality of UEs in the first network segment. In some embodiments, monitoring the location of a particular UE can include identifying the tracking area in which the UE is located. A UE indicates to a network node (e.g., the AMF) when it moves between tracking areas. Thus, for each UE that is receiving service from the network 100, a network node (e.g., the AMF) knows the tracking area where the UE is located. This will be discussed in greater detail below. Alternatively, in other embodiments, monitoring the location of a particular UE can include identifying a cell identifier corresponding to a specific base station (e.g., NR radio, or gNodeB) that is providing service to the UE.

The method 200 can also include monitoring 205 the voice call activity of the plurality of UEs. When a UE places or receives a voice call (e.g., a VoNR call), a network node (e.g., the AMF) can handle the setup of the call. Thus, a network node (e.g., the AMF) can be aware when a UE places or receives a voice call.

In a 5G network segment, a voice call is identified by a packet flow with particular quality of service (QoS) profile. For a voice call, the QoS profile includes Guaranteed Flow Bit Rate (both uplink and downlink) and Maximum Packet Loss Rate (both uplink and downlink).

If it is determined 207 that a UE is going to participate in an IP packet-based voice call, the method 200 can also include determining 209 whether the UE is located in the transition region 110 of the first network segment. In some embodiments, determining 209 whether the UE is located in the transition region 110 can include determining whether the UE is located in a tracking area that has been designated as part of the transition region 110 (i.e., a tracking area where UEs should be switched from the first radio access technology to the second radio access technology). Alternatively, in some embodiments, determining 209 whether the UE is located in the transition region 110 can include determining whether the cell identifier of the base station that is providing service to the UE has been designated as part of the transition region 110.

If it is determined 209 that the UE is not located in the transition region 110 of the first network segment, then the method 200 can include allowing 211 the IP packet-based voice call to proceed using the first radio access technology.

If, however, it is determined 209 that the UE is located in the transition region 110 of the first network segment, then the method 200 can include causing 213 the UE to be switched to a second radio access technology for the IP packet-based voice call. In some embodiments, causing 213 the UE to be switched to the second radio access technology for the IP packet-based voice call can include sending one or more commands to a base station that is providing service to the UE. The command(s) can be configured so that they will be interpreted by the base station as an instruction to cause the UE to be switched to the second radio access technology for the IP packet-based voice call.

For example, in a 5G network segment, the AMF as part of regular handling of UE transitions from idle to active (e.g., to place or receive a voice call) can indicate to the serving gNodeB that "fallback to EPS voice is required" when in the transition area(s) 110 of the network 100. The gNodeB based on this indication from the AMF can initiate the handover from 5G to 4G when the UE idle-to-active transition is associated with a voice call setup.

Once the UE has been switched to the second radio access technology, the method 200 can include continuing to monitor 215 the location of the UE. If it is determined 217 that the UE is moving outside of the coverage area of the first network segment and into the coverage area of the second network segment, the method 200 can include causing 219 a handoff of the voice call from the first network segment to the second network segment. As part of this handoff, the IP packet-based voice call can be transitioned to a circuit-switched voice call that is compatible with the capabilities of the second network segment.

Figure 3:
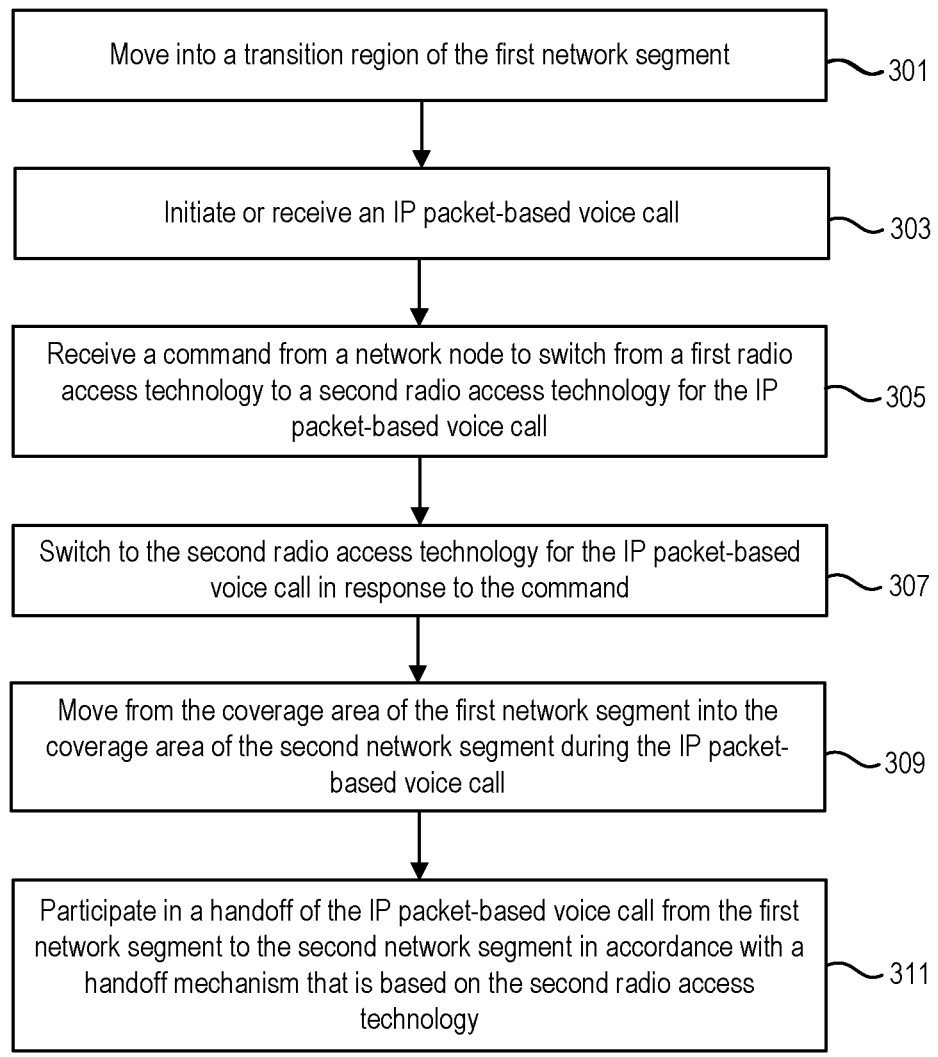
FIG. 3 illustrates an example of a method that can be implemented by a user equipment (UE) in accordance with the present disclosure.

FIG. 3 illustrates an example of a method 300 that can be implemented by a UE in accordance with the present disclosure. For the sake of clarity, the method 300 will be described in relation to the mobile telecommunications network 100 shown in FIG. 1.

In the discussion of the method 300, it will be assumed that the UE that is implementing the method 300 is receiving wireless communication services from a first network segment of the mobile telecommunications network 100 using a first radio access technology (e.g., the 5G NR radio access technology). It will also be assumed that the first network segment is capable of providing the wireless communication services to the UE using a second radio access technology (e.g., the 4G LTE radio access technology).

The method 300 can include moving 301 into the transition region 110 of the first network segment. As discussed above, the transition region 110 can be a part of the first network segment that is relatively close to the end of the coverage area of the first network segment and that is also close to the coverage area of the second network segment.

The method 300 can also include initiating or receiving 303 an IP packet-based voice call. In response to initiating or receiving 303 the IP packet-based voice call, the UE can receive 305 a command from a network node to switch from the first radio access technology to the second radio access technology for the IP packet-based voice call. As discussed above, a network node can send this type of command to the UE because the UE initiated or received 303 the IP packet-based voice call while the UE is located in the transition region 110 of the first network segment. The UE can switch 307 to the second radio access technology for the IP packet-based voice call in response to the command.

At some point, the UE can move 309 from the coverage area of the first network segment into the coverage area of the second network segment. When this occurs, the UE can participate 311 in a handoff of the IP packet-based voice call from the first network segment to the second network segment. The handoff can proceed in accordance with a handoff mechanism that is based on the second radio access technology (e.g., a VoLTE SRVCC mechanism). As part of this handoff mechanism, the IP packet-based voice call can be transitioned to a circuit-switched voice call that is compatible with the capabilities of the second network segment.

As noted above, in some embodiments a transition region can be defined in relation to tracking areas of a mobile telecommunications network. Some examples will now be described illustrating how this could be implemented.

A mobile telecommunications network can include a plurality of base stations. A base station can provide radio coverage for a particular geographic area, which can be referred to as a "cell."

The concept of a tracking area has been defined to help network entities keep track of the positions of UEs as they move around in a mobile telecommunications network. A tracking area can include a logical grouping of cells.

Figure 4:
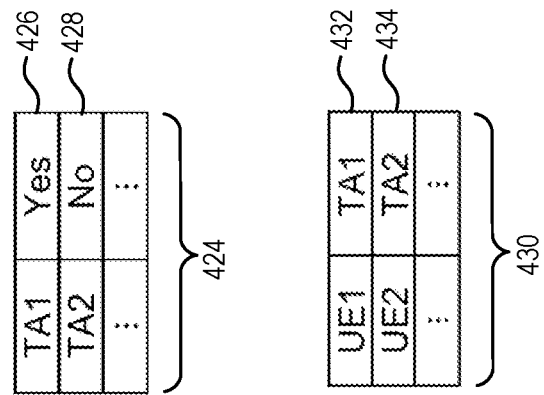
FIG. 4 illustrates an example showing how a transition region can be defined in relation to tracking areas of a mobile telecommunications network.
Figure 4:
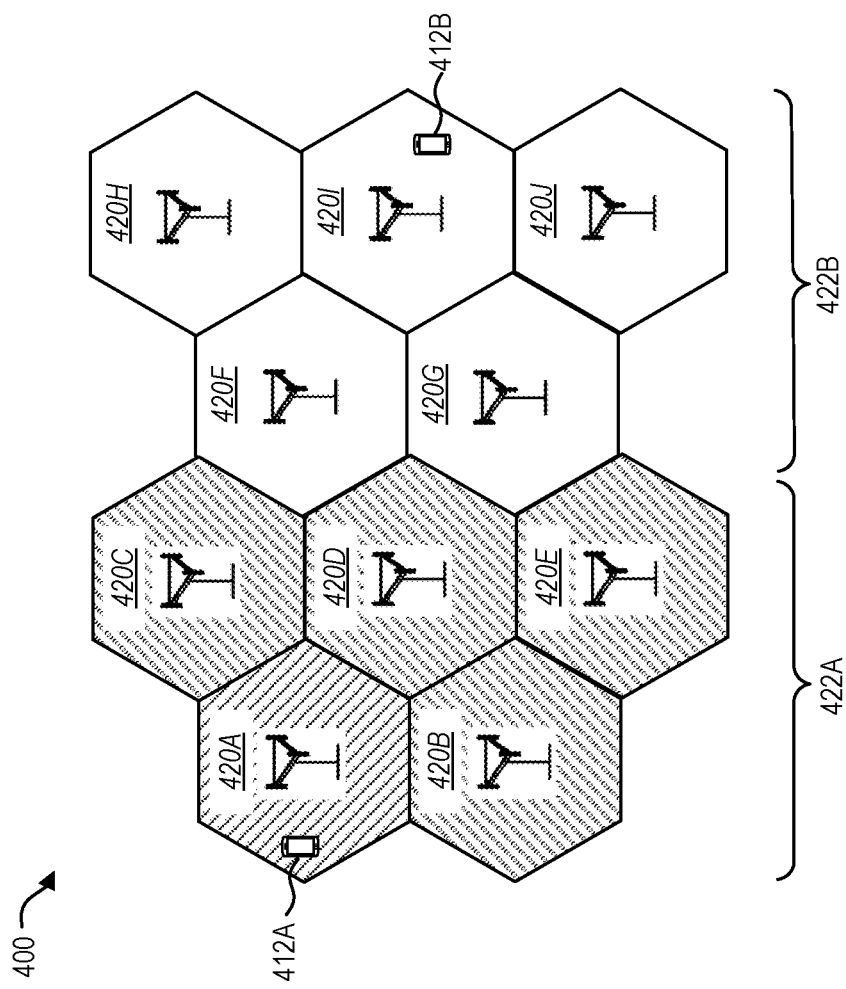

FIG. 4 illustrates an example of a mobile network 400 that includes a plurality of cells within a network segment. The plurality of cells include cell A 420A, cell B 420B, cell C 420C, cell D 420D, cell E 420E, cell F 420F, cell G 420G, cell H 420H, cell I 420I, and cell J 420J.

The plurality of cells 420A-J are divided into a plurality of tracking areas. In particular, the mobile network 400 shown in FIG. 4 includes a first plurality of cells 420A-E that belong to a first tracking area 422A and a second plurality of cells 420F-J that belong to a second tracking area 422B. To distinguish the first tracking area 422A from the second tracking area 422B, the first plurality of cells 420A-E that belong to the first tracking area 422A are shaded. A first UE 412A is shown in cell A 420A within the first tracking area 422A, and a second UE 412B is shown in cell I 420I within the second tracking area 422B.

For each UE that is receiving service from the network 400, the network 400 knows the tracking area where the UE is located. This makes it possible for a UE to receive a call wherever it is located.

When a UE initially connects to the network 400 and begins receiving service from the network 400, the UE's tracking area can be registered with the network 400. More specifically, the base station that is providing service to the UE can send an indication of the UE's tracking area to a network node. For example, in a 5G network segment, a gNodeB can send an indication of the UE's tracking area to the AMF. For example, if the first UE 412A is located in cell A 420A when it initially begins receiving service from the network 400, the base station that is providing service to the first UE 412A can send the network 400 a message identifying the first tracking area 422A. As another example, if the second UE 412B is located in cell I 420I when it initially begins receiving service from the network 400, the base station that is providing service to the second UE 412B can send the network 400 a message identifying the second tracking area 422B.

As a UE moves around within the network 400, the UE can keep the network 400 up to date with respect to the UE's location. This is sometimes referred to as location updating. When a UE begins receiving service from the network 400 and a network node accepts the UE, the network node can provide a UE with a list of one or more tracking area identifiers. If the UE moves within the list of tracking areas, it does not need to notify the network node. However, when the UE moves to a tracking area that is not on the list, then it can update the network node. In a 5G network segment, the AMF is the network node that supplies the list of tracking areas to a UE. In a 4G network segment, the Mobility Management Entity (MME) is the network node that supplies the list of tracking areas to a UE.

Whenever a UE moves into a cell that belongs to a tracking area that is not included in the list of tracking areas that it has received from the network node, the UE can perform a tracking area update. For example, if the first UE 412A moves from cell A 420A in the first tracking area 422A to cell F 420F in the second tracking area 422B, and if the second tracking area 422B is not in the list of tracking areas that it has received from the network node, then the first UE 412A should perform a tracking area update to inform the network 400 about the change. On the other hand, if a UE moves into a different cell that belongs to the same tracking area that it is currently registered with (or that is included in the list of tracking areas that it has received from the network node), a tracking area update is not necessary. For example, if the first UE 412A moves from cell A 420A in the first tracking area 422A to cell C 420C in the first tracking area 422A, then it is not necessary for the first UE 412A to perform a tracking area update to inform the network 400 about the change.

As discussed above, the tracking areas of a mobile network can be used to define a transition region (such as the transition region 110 shown in FIG. 1). For example, in some embodiments, each tracking area in a mobile network can be designated as either belonging to a transition region or not belonging to a transition region. In such embodiments, determining whether a particular UE is located within a transition region of a network segment can include identifying the tracking area where the UE is located and determining whether or not the tracking area has been designated as belonging to the transition region.

In the example shown in FIG. 4, the network 400 can store information about the tracking areas 422A-B in the network 400 and about the locations of the various UEs 412A-B in those tracking areas 422A-B. Examples of data structures that can be used to store this information are shown in FIG. 4.

More specifically, FIG. 4 shows a first table 424 that stores information indicating, for each tracking area in the network 400, whether the tracking area belongs to a transition region. The first table 424 includes a first record 426 indicating that the first tracking area 422A (which is designated TA1) belongs to a transition region. The first table 424 also includes a second record 428 indicating that the second tracking area 422B (which is designated TA2) does not belong to a transition region.

FIG. 4 also shows a second table 430 that stores information indicating, for each UE that is receiving service from the network 400, the tracking area where the UE is located. The second table 430 includes a first record 432 indicating that the first UE 412A (which is designated UE1) is located in the first tracking area 422A. The second table 430 also includes a second record 434 indicating that the second UE 412B (which is designated UE2) is located in the second tracking area 422B.

For the sake of simplicity, in the example shown in FIG. 4 the network 400 includes only two tracking areas 422A-B. Also, only two UEs 412A-B are shown in the network 400. Of course, the simplicity of this example should not be interpreted as limiting the scope of the present disclosure. A network that implements the techniques disclosed herein can, of course, include many more than two tracking areas, and can provide service to many more than two UEs.

Figure 5:
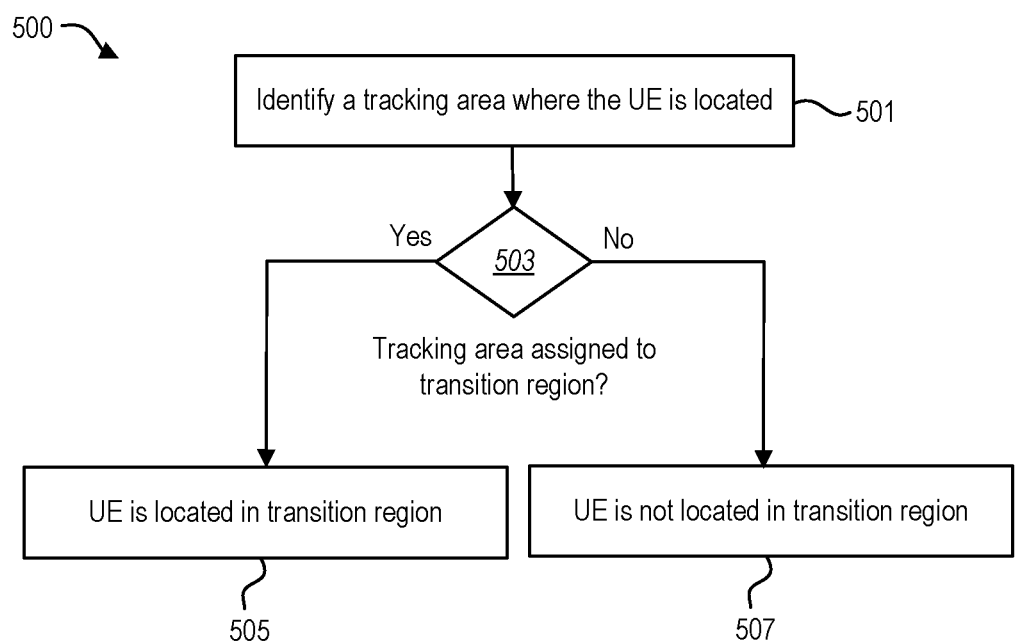
FIG. 5 illustrates an example of a method that can be implemented to determine whether a UE is located within a transition region of a network segment.

FIG. 5 illustrates an example of a method 500 that can be implemented to determine whether a UE is located within a transition region of a network segment. The method 500 can be implemented by a network node. In some embodiments, the network node can be an AMF (for a 5G network segment) or an MME (for a 4G network segment). For the sake of clarity, the method 500 will be described in relation to the mobile network 400 shown in FIG. 4.

The method 500 can include identifying 501 a tracking area where the UE is located. In some embodiments, this can include accessing one or more data structures (such as the second table 430 shown in FIG. 4) that include this information. For example, to identify a tracking area where the first UE 412A shown in FIG. 4 is located, a network node can access the first record 432 in the second table 430. Based on the information contained in the first record 432, the network node can determine that the first UE 412A is located in the first tracking area 422A. As another example, to identify a tracking area where the second UE 412B shown in FIG. 4 is located, a network node can access the second record 434 in the second table 430. Based on the information contained in the second record 434, the network node can determine that the second UE 412B is located in the second tracking area 422B.

Once the tracking area where the UE is located has been identified, the method 500 can then include determining 503 whether the tracking area has been assigned to the transition region of the network segment. In some embodiments, this can include accessing one or more data structures (such as the first table 424 shown in FIG. 4) that include this information. For example, to determine whether the first tracking area 422A has been assigned to the transition region, a network node can access the first record 426 in the first table 424. Based on the information contained in the first record 426, the network node can determine that the first tracking area 422A has been assigned to the transition region. To determine whether the second tracking area 422B has been assigned to the transition region, a network node can access the second record 428 in the first table 424. Based on the information contained in the second record 428, the network node can determine that the second tracking area 422B has not been assigned to the transition region.

If the tracking area where the UE is located has been assigned to the transition region, the method 500 can include determining 505 that the UE is located in the transition region. After making this determination, the network can then cause the UE to be switched to a different radio access technology (e.g., switched from the 5G NR radio access technology to the 4G LTE radio access technology) when it detects the UE making or receiving a voice call, as discussed above.

If the tracking area where the UE is located has not been assigned to the transition region, the method 500 can include determining 507 that the UE is not located in the transition region. After making this determination, the UE can be permitted to keep using its current radio access technology (e.g., the 5G NR radio access technology) for voice calls.

Although the above method 500 has been described in relation to tracking areas, this should not be interpreted as limiting the scope of the present disclosure. As indicated above, in some embodiments a transition region can be defined in terms of cell identifiers. In a 5G network segment, a 5G cell identifier can refer to a specific NR radio (gNodeB).

Figure 6:
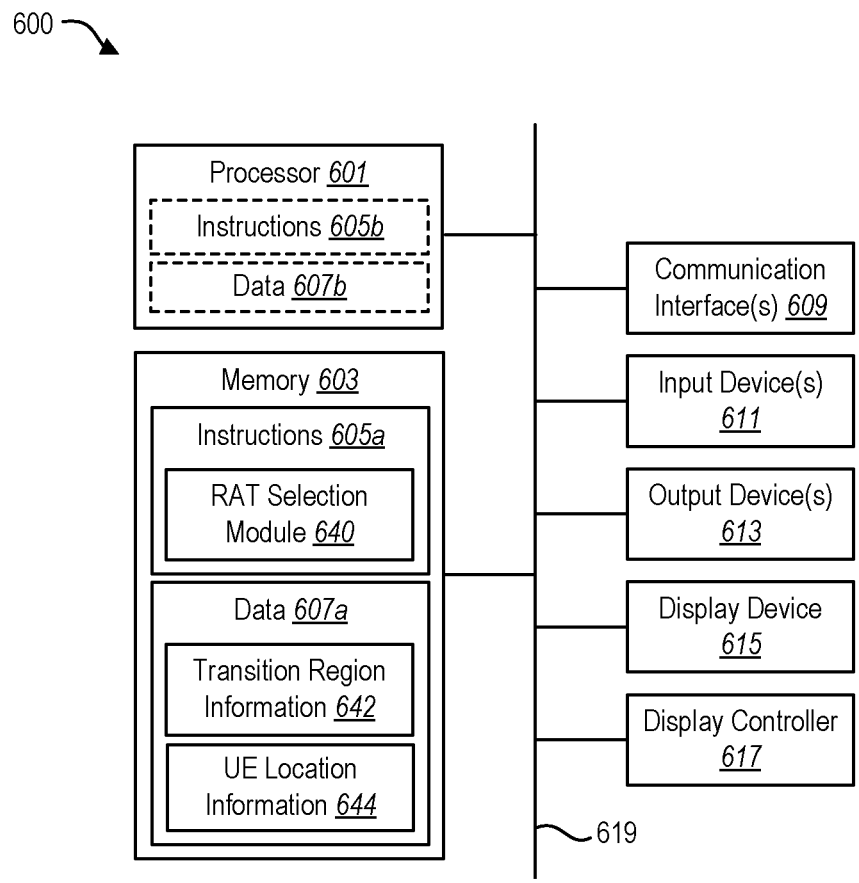
FIG. 6 illustrates certain components that can be included within a network node.

As discussed above, one or more network nodes can implement aspects of the techniques disclosed herein (such as the method 200 shown in FIG. 2). A network node can be implemented using one or more computing devices. FIG. 6 illustrates certain components that can be included within a computing device 600.

The computing device 600 includes a processor 601 and memory 603 in electronic communication with the processor 601. Instructions 605a and data 607a can be stored in the memory 603. The instructions 605a can be executable by the processor 601 to implement some or all of the methods, steps, operations, actions, or other functionality related to a network node that is disclosed herein. Executing the instructions 605a can involve the use of the data 607a that is stored in the memory 603. When the processor 601 executes the instructions 605a, various instructions 605b can be loaded onto the processor 601, and various pieces of data 607b can be loaded onto the processor 601.

Unless otherwise specified, any of the various examples of modules and components described herein in connection with a network node can be implemented, partially or wholly, as instructions 605a stored in memory 603 and executed by the processor 601. Any of the various examples of data described herein in connection with a network node can be among the data 607a that is stored in memory 603 and used during execution of the instructions 605a by the processor 601.

Although just a single processor 601 and a single memory 603 are shown in the computing device 600 of FIG. 6, in an alternative configuration, a combination of processors and/or a combination of memory devices could be used.

The instructions 605a in the memory 603 can include a radio access technology (RAT) selection module 640. The RAT selection module 640 represents instructions 605a that can be executable by the processor 601 to perform some or all aspects of the methods 200, 500 that were described above in connection with FIG. 5.

The data 607a stored in the memory 603 can include any of the various examples of data described herein in connection with the method 200 of FIG. 2, or otherwise described in connection with a network node.

For example, the data 607a stored in the memory 603 can include information defining one or more transition regions in one or more network segments. Such information is represented in FIG. 6 as transition region information 642. The transition region information 642 can be in stored in one or more data structures, such as the first table 424 shown in FIG. 4.

The data 607a stored in the memory 603 can also include information about the location of a plurality of UEs in one or more network segments. Such information is represented in FIG. 6 as UE location information 644. The UE location information 644 can be in stored in one or more data structures, such as the second table 430 shown in FIG. 4.

The computing device 600 can also include one or more communication interfaces 609 for communicating with other electronic devices. The communication interface(s) 609 can be used to send information to and receive information from UEs. For example, as discussed above, under some circumstances a network node can cause a UE to be switched to a different radio access technology for a voice call. This can include sending command(s) to the UE. Such command(s) can be sent via the communication interface(s) 609.

The communication interface(s) 609 can be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 600 can also include one or more input devices 611 and one or more output devices 613. Some examples of input devices 611 include a keyboard, mouse, microphone, touchpad, remote control device, button, joystick, and trackball. One specific type of output device 613 that is typically included in a computing device 600 is a display device 615. Display devices 615 used with embodiments disclosed herein can utilize any suitable image projection technology, such as liquid crystal display (LCD), light-emitting diode (LED), gas plasma, electroluminescence, or the like. A display controller 617 can also be provided, for converting data 607a stored in the memory 603 into text, graphics, and/or moving images (as appropriate) shown on the display device 615. The computing device 600 can also include other types of output devices 613, such as a speaker, a printer, etc.

The various components of the computing device 600 can be coupled together by one or more buses, which can include a power bus, a control signal bus, a status signal bus, a data bus, etc. For the sake of clarity, the various buses are illustrated in FIG. 6 as a bus system 619.

Figure 7:
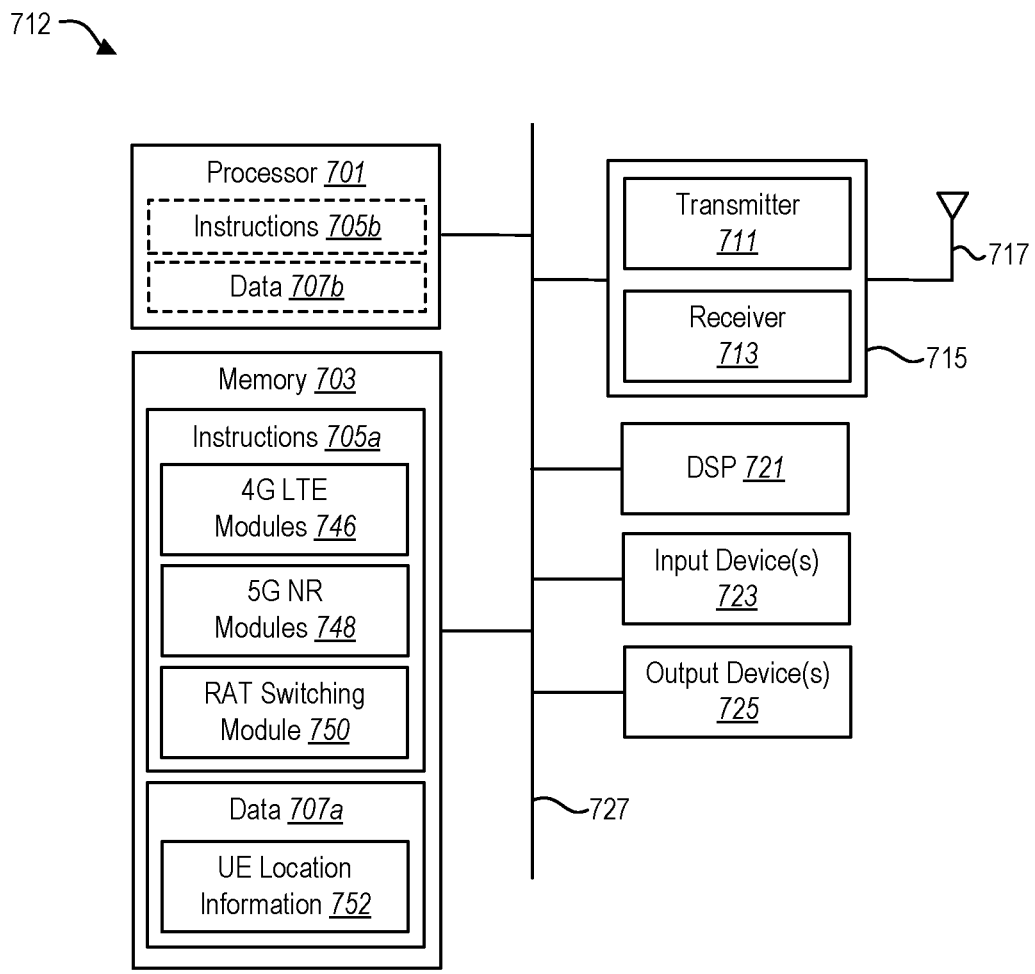
FIG. 7 illustrates certain components that can be included within a UE.

FIG. 7 illustrates certain components that can be included within a UE 712. The UE 712 is an example of a possible implementation of the UEs described herein (e.g., the UEs 112A-B in FIG. 1, the UEs 412A-B in FIG. 4).

The UE 712 includes a processor 701 and memory 703 in electronic communication with the processor 701. Instructions 705a and data 707a can be stored in the memory 703. The instructions 705a can be executable by the processor 701 to implement some or all of the methods, steps, operations, actions, or other functionality related to a UE that is disclosed herein. Executing the instructions 705a can involve the use of the data 707a that is stored in the memory 703. When the processor 701 executes the instructions 705a, various instructions 705b can be loaded onto the processor 701, and various pieces of data 707b can be loaded onto the processor 701.

Unless otherwise specified, any of the various examples of modules and components described herein in connection with a UE can be implemented, partially or wholly, as instructions 705a stored in memory 703 and executed by the processor 701. Any of the various examples of data described herein in connection with a UE can be among the data 707a that is stored in memory 703 and used during execution of the instructions 705a by the processor 701.

Although just a single processor 701 and a single memory 703 are shown in the UE 712 of FIG. 7, in an alternative configuration, a combination of processors and/or a combination of memory devices could be used.

The instructions 705a in the memory 703 can include various modules that enable the UE 712 to communicate in accordance with the 4G LTE radio access technology. Such modules are represented as 4G LTE modules 746 in FIG. 7.

The instructions 705a in the memory 703 can also include various modules that enable the UE 712 to communicate in accordance with the 5G NR radio access technology. Such modules are represented as 5G NR modules 748 in FIG. 7.

The instructions 705a in the memory 703 can also include a radio access technology (RAT) switching module 750. The RAT switching module 750 represents instructions 705a that can be executable by the processor 701 to perform some or all aspects of the method 300 that was described above in connection with FIG. 3.

The data 707a stored in the memory 703 can include any of the various examples of data described herein in connection with the method 200 of FIG. 2, or otherwise described in connection with a UE.

For example, the data 707a stored in the memory 703 can include information about the location of the UE 712. Such information is represented in FIG. 6 as UE location information 752. In some embodiments, the UE location information 752 can identify a tracking area in which the UE 712 is located and/or a cell identifier corresponding to a base station that is providing service to the UE 712.

The UE 712 can also include a transmitter 711 and a receiver 713 to allow transmission and reception of signals to and from the UE 712 via one or more antennas 717. The transmitter 711 and receiver 713 may be collectively referred to as a transceiver 715. The UE 712 may also include (not shown) multiple transmitters, multiple antennas, multiple receivers and/or multiple transceivers.

The UE 712 can also include a digital signal processor (DSP) 721. The UE 712 can also include one or more input devices 723 and one or more output devices 725. The input device(s) 723 and the output device(s) 725 enable a user to interact with the UE 712.

The various components of the UE 712 can be coupled together by one or more buses, which may include a power bus, a control signal bus, a status signal bus, a data bus, etc. For the sake of clarity, the various buses are represented in FIG. 7 as a bus system 727.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for minimizing disruption to a voice call in a mobile telecommunications network comprising a first network segment and a second network segment, the first network segment and the second network segment having different capabilities for supporting voice calls, the method being implemented by a network node in the mobile telecommunications network, the method comprising:
    defining a transition region of theft first network segment that can provide wireless communication services using a first radio access technology and a second radio access technology and that supports Internet protocol (IP) packet-based voice calls, the transition region being defined as a region of coverage for the first network segment and the second network segment that is within a pre-defined distance of a boundary between a first coverage area of the first network segment and a second coverage area of the second network segment, wherein the first coverage area provides wireless communication services for IP packet-based voice calls using both the first radio access technology and the second radio access technology, and wherein the second coverage area does not provide wireless communication services for packet-based voice calls using the first radio access technology or the second radio access technology and does not support a first handoff mechanism based on the first radio access technology;
    receiving an indication that a user equipment (UE) that is receiving wireless communication services from the first network segment using the first radio access technology is going to participate in an IP packet-based voice call;
    determining that the UE is located within the transition region of the first network segment; and
    while the UE is in the first coverage area and based on the UE being located in the transition region, causing the UE to be switched to the second radio access technology for the IP packet-based voice call prior to the UE moving from the first coverage area and into the second coverage area.

2. The method of claim 1, wherein:
    the first radio access technology comprises a fifth generation (5G) New Radio (NR) radio access technology;
    the second radio access technology comprises a fourth generation (4G) Long Term Evolution (LTE) radio access technology; and
    causing the UE to be switched includes causing the UE to be switched from 5G NR to 4G LTE while the UE is in the first coverage area capable of providing wireless communication services using both 5G NR and 4G LTE and prior to the UE moving from the first coverage area and into the second coverage area that does not provide wireless communication services using 5G NR or 4G LTE.

3. The method of claim 1,
    wherein the first handoff mechanism comprises a Voice over New Radio (VoNR) Single Radio Voice Call Continuity (SRVCC) mechanism; and
    wherein the second network segment supports a second handoff mechanism, the second handoff mechanism comprising a Voice over LTE (VoLTE) SRVCC mechanism.

4. The method of claim 1, wherein determining that the UE is located within the transition region of the first network segment comprises:
    identifying a tracking area where the UE is located; and
    determining that the tracking area has been assigned to the transition region.

5. The method of claim 1, wherein determining that the UE is located within the transition region of the first network segment comprises:
    identifying a cell identifier corresponding to a base station that is providing service to the UE; and
    determining that the cell identifier has been assigned to the transition region.

6. The method of claim 1, further comprising:
    detecting that the UE is moving from the first network segment to the second network segment; and
    causing a handoff of the IP packet-based voice call from the first network segment to the second network segment, the handoff occurring in accordance with the second handoff mechanism that is based on the second radio access technology.

7. The method of claim 1, wherein receiving the indication that the UE is going to participate in the IP packet-based voice call comprises detecting that the UE has initiated the IP packet-based voice call.

8. The method of claim 1, wherein receiving the indication that the UE is going to participate in the IP packet-based voice call comprises detecting that the UE has received the IP packet-based voice call.

9. A method for minimizing disruption to a voice call in a mobile telecommunications network comprising a first network segment and a second network segment, the first network segment and the second network segment having different capabilities for supporting voice calls, the method being implemented by a user equipment (UE) that is receiving wireless communication services from the first network segment of the mobile telecommunications network using a first radio access technology, the first network segment also being configured to provide the wireless communication services using a second radio access technology, the method comprising:
    receiving a command from a network node to switch from the first radio access technology to the second radio access technology for an Internet protocol (IP) packet-based voice call, the command being received based on the UE being located within a transition region of the first network segment, the transition region being defined as a region of coverage for the first network segment and the second network segment that is within a pre-defined distance of a boundary between a first coverage area of the first network segment and a second coverage area of a second network segment, wherein the first coverage area provides wireless communication services for IP packet-based voice calls using both the first radio access technology and the second radio access technology, and wherein the second coverage area does not provide IP packet-based voice calls using the first radio access technology or the second radio access technology and does not support a first handoff mechanism based on the first radio access technology;
    while the UE is in the first coverage area and based on the UE being located in the transition region, switching the UE to the second radio access technology for the IP packet-based voice call in response to the command, wherein the network node anticipates movement of the UE from the first coverage area to the second coverage area during the duration of the voice call, and wherein the network node sends the command prior to the UE moving from the first coverage area and into the second coverage area.

10. The method of claim 9, wherein:
    the first radio access technology comprises a fifth generation (5G) New Radio (NR) radio access technology;
    the second radio access technology comprises a fourth generation (4G) Long Term Evolution (LTE) radio access technology; and
    switching the UE includes switching the UE from 5G NR to 4G LTE while the UE is in the first coverage area that provides wireless communication services using both 5G NR and 4G LTE and prior to the UE moving from the first coverage area and into the second coverage area that does not provide wireless communication services using 5G NR or 4G LTE.

11. The method of claim 9, wherein:
the first handoff mechanism comprises a Voice over New Radio (VoNR) Single Radio Voice Call Continuity (SRVCC) mechanism; and
the second handoff mechanism comprises a Voice over LTE (VoLTE) SRVCC mechanism.

12. The method of claim 9, further comprising initiating the IP packet-based voice call, wherein the command is received in response to initiating the IP packet-based voice call.

13. The method of claim 9, further comprising receiving the IP packet-based voice call, wherein the command is received in response to receiving the IP packet-based voice call.

14. A system for minimizing disruption to a voice call in a mobile telecommunications network comprising a first network segments and a second network segment, the first network segment and the second network segment having different capabilities for supporting voice calls, the system comprising:
one or more processors;
memory in electronic communication with the one or more processors; and
instructions stored in the memory, the instructions being executable by the one or more processors to:
define a transition region of the first network segment that can provide wireless communication services using a first radio access technology and a second radio access technology and that supports Internet protocol (IP) packet-based voice calls, the transition region being defined as a region of coverage for the first network segment and the second network segment that is within a pre-defined distance of a boundary between a first coverage area of the first network segment and a second coverage area of a second network segment, wherein the first coverage area provides wireless communication services for IP packet-based voice calls using both the first radio access technology and the second radio access technology, and wherein the second coverage area does not provide wireless communication services for packet-based voice calls using the first radio access technology or the second radio access technology and does not support a first handoff mechanism based on the first radio access technology;
receive an indication that a user equipment (UE) that is receiving wireless communication services from the first network segment using the first radio access technology is going to participate in an IP packet-based voice call;
determine that the UE is located within the transition region of the first network segment; and
while the UE is in the first coverage area, and based on the UE being located in the transition region, cause the UE to be switched to the second radio access technology for the IP packet-based voice call prior to the UE moving from the first coverage area and into the second coverage area.

15. The system of claim 14, wherein:
the first radio access technology comprises a fifth generation (5G) New Radio (NR) radio access technology;
the second radio access technology comprises a fourth generation (4G) Long Term Evolution (LTE) radio access technology; and
the instruction executable by the one or more processors to cause the UE to be switched are executable to cause the UE to be switched from 5G NR to 4G LTE while the UE is in the first coverage area that provides wireless communication services using both 5G NR and 4G LTE and prior to the UE moving from the first coverage area and into the second coverage area that does not provide wireless communication services using 5G NR or 4G LTE.

16. The system of claim 14,
wherein the first handoff mechanism comprises a Voice over New Radio (VoNR) Single Radio Voice Call Continuity (SRVCC) mechanism; and
wherein the second network segment supports a second handoff mechanism, the second handoff mechanism comprising a Voice over LTE (VoLTE) SRVCC mechanism.

17. The system of claim 14, wherein determining that the UE is located within the transition region of the first network segment comprises:
identifying at least one of a tracking area where the UE is located or a cell identifier corresponding to a base station that is providing service to the UE; and
determining that the tracking area or the cell identifier has been assigned to the transition region.

18. The system of claim 14, wherein the instructions are additionally executable by the one or more processors to:
detect that the UE is moving from the first network segment to the second network segment; and
cause a handoff of the IP packet-based voice call from the first network segment to the second network segment, the handoff occurring in accordance with the second handoff mechanism that is based on the second radio access technology.

19. The system of claim 14, wherein receiving the indication that the UE is going to participate in the IP packet-based voice call comprises detecting that the UE has initiated the IP packet-based voice call.

20. The system of claim 14, wherein receiving the indication that the UE is going to participate in the IP packet-based voice call comprises detecting that the UE has received the IP packet-based voice call.

* * * * *